US010125743B2

(12) United States Patent
Gaillardon et al.

(10) Patent No.: US 10,125,743 B2
(45) Date of Patent: Nov. 13, 2018

(54) METHOD FOR DE-ICING COMPOSITE MATERIAL STRUCTURES, PARTICULARLY BLADES OF A WIND TURBINE

(71) Applicant: VALEOL, Begles (FR)

(72) Inventors: Bastien Gaillardon, Bordeaux (FR); Serge Gracia, Navarra (ES); Mathieu Oyharcabal, Talence (FR); Thomas Olinga, Floirac (FR)

(73) Assignee: VALEOL, Begles (FR)

( * ) Notice: Subject to any disclaimer, the term of this patent is extended or adjusted under 35 U.S.C. 154(b) by 865 days.

(21) Appl. No.: 14/366,009

(22) PCT Filed: Dec. 19, 2012

(86) PCT No.: PCT/FR2012/053005
§ 371 (c)(1),
(2) Date: Jun. 17, 2014

(87) PCT Pub. No.: WO2013/093349
PCT Pub. Date: Jun. 27, 2013

(65) Prior Publication Data
US 2014/0363291 A1 Dec. 11, 2014

(30) Foreign Application Priority Data

Dec. 19, 2011 (FR) ...................... 11 61867

(51) Int. Cl.
*F03D 80/40* (2016.01)
*F03D 11/00* (2006.01)
(Continued)

(52) U.S. Cl.
CPC ............ *F03D 11/0025* (2013.01); *C09D 5/24* (2013.01); *F03D 80/40* (2016.05); *H05B 3/146* (2013.01); *H01B 1/128* (2013.01); *Y02E 10/72* (2013.01)

(58) Field of Classification Search
CPC ........... F03D 80/40; C09D 5/24; H05B 3/146; Y02E 10/721; B64D 15/12; B64D 15/14; H01B 1/128
(Continued)

(56) References Cited

U.S. PATENT DOCUMENTS 4,942,078 A * 7/1990 Newman ................. B32B 27/04
219/528
8,752,279 B2 * 6/2014 Brittingham ............... C08J 3/18
29/611
(Continued)

FOREIGN PATENT DOCUMENTS

FR  2 880 350        7/2006
GB   2252285    *   8/1992
(Continued)

OTHER PUBLICATIONS

French Search Report dated Nov. 23, 2012, corresponding to the Foreign Priority Application No. 1161867.
(Continued)

*Primary Examiner* — Brian K Talbot
(74) *Attorney, Agent, or Firm* — Young & Thompson

(57) ABSTRACT

The method for de-icing composite material structures, particularly blades of a wind turbine made from composite materials, includes the following steps: disposing at least one layer of a formulation of conductive polymer on at least one portion of the surface of the structure, providing an appropriate electrical power supply for the structure, and connecting the layer of a formulation of conductive polymer to the electrical power supply in such a way as to cause the conductive layer of conductive polymer to heat up, controlling the electrical power supply depending on climatic
(Continued)

conditions. The required composition and suitable device are also described. A specific application is the blades of wind turbines.

8 Claims, 1 Drawing Sheet

(51) Int. Cl.
    *C09D 5/24*     (2006.01)
    *H05B 3/14*     (2006.01)
    *H01B 1/12*     (2006.01)

(58) Field of Classification Search
    USPC .................................................. 427/591, 592
    See application file for complete search history.

(56) References Cited

U.S. PATENT DOCUMENTS

| | | | | |
|---|---|---|---|---|
| 8,915,058 | B2* | 12/2014 | Knott | F01D 5/18 |
| | | | | 165/133 |
| 8,931,740 | B2* | 1/2015 | Nordin | B64C 3/20 |
| | | | | 244/134 D |
| 9,309,001 | B2* | 4/2016 | Calder | |
| 2002/0139956 | A1* | 10/2002 | Simendinger, III | C09D 163/00 |
| | | | | 252/70 |
| 2005/0180854 | A1* | 8/2005 | Grabau | F03D 1/065 |
| | | | | 416/241 R |
| 2008/0099617 | A1* | 5/2008 | Gilmore | B64D 15/14 |
| | | | | 244/134 R |
| 2010/0096507 | A1* | 4/2010 | Villinger | B64D 15/12 |
| | | | | 244/134 D |

FOREIGN PATENT DOCUMENTS

| | | | |
|---|---|---|---|
| WO | 2008/048176 | | 4/2008 |
| WO | 2010/028653 | | 3/2010 |
| WO | WO2010028653 | * | 3/2010 |
| WO | 2011/096851 | | 8/2011 |
| WO | WO2011096851 | * | 8/2011 |

OTHER PUBLICATIONS

International Search Report, dated Oct. 12, 2014, from corresponding PCT application.

* cited by examiner

METHOD FOR DE-ICING COMPOSITE MATERIAL STRUCTURES, PARTICULARLY BLADES OF A WIND TURBINE

This invention relates to a method for de-icing composite material structures, particularly a method for de-icing blades of a wind turbine. The object of the invention is also the suitable polymer composition.

The invention also covers the associated device for power and control.

This invention is described with regard to the icing of wind turbine blades because it involves a very significant problem, but the method could be adapted to other composite material structures.

BACKGROUND OF THE INVENTION

Wind turbines are a source of renewable energy that has appealed to our civilization for being able to compensate in part for the energies with a carbon origin or with a nuclear origin to produce electricity. Even if the amounts produced remain small, they cost nothing during production except the initial depreciation and maintenance, having no carbon impact and being able to work for 20 to 30 years, with nearly automatic control.

These wind turbines work in given wind speed ranges, as a function of their mechanical strength and of numerous other parameters linked to the wind class associated with the site according to standards such as that of the IEC (International Electrotechnical Commission).

When wind turbines are not working, the blades are feathered, i.e., they do not engage the wind when the wind is too strong, and they are in waiting position when the wind is insufficient, and the blades therefore remain almost immobile or free in rotation.

The shapes of the wind turbine blades are of the wing type, like an airplane wing with a pressure face, a blade back, a leading edge and a trailing edge, generating excess pressures and negative pressures of air. Now, the blades rotate at a high speed of rotation, between 10 and 20 revolutions/minute especially when they are at their maximum allowed yield, and the speeds reached at the end of the blades are very high, between 70 and 80 m/sec with therefore significant negative pressure or turbulence phenomena.

Now it is found that, under certain atmospheric conditions, the blades are covered with a layer of frost and at the very least even with a layer of ice, either during operation or when they are shut down, like any structure outdoors and especially when there is a strong exposure to bad weather.

Wind turbines are wisely installed in windy places that are the tops of hills or wind-swept mountains or at sea, and, offshore in particular, the conditions can be extreme.

If the blades become covered with frost, this poses numerous and serious problems of overloads, of imbalance, of vibrations, of breaking-off of sheets of ice or of frost.

If the blades are covered with a layer, even a thin layer, of frost or ice, it is very advantageous to be able to de-ice the blades to ensure the safe and continuous operation of the wind turbine. Actually, there may not be any wind with frost conditions that lead to the formation of a thick layer of frost; if the next day the wind conditions are suitable without icing conditions, despite a cold such that the thick layer of frost is still in place, it would be useful to de-ice to put the wind turbine in production condition.

Thus, certain wind farms that are already established and certain wind farms in the process of being set up or planned could find there a salvaging of a theoretical annual period of production of several percentage points, which is far from being negligible.

In addition, it is also known that the unwanted layer poses safety problems because it can cause the breaking of the blades or of the rotor. It is furthermore difficult to imagine very greatly increasing the mechanical strength of the blades to respond to this problem, which would adversely affect the operation during the rest of the time, i.e., the major part. This mechanical reinforcement will also have an impact on the manufacturing cost because it is, of course, the entire structure that has to be reinforced.

Another safety problem, that of the ice sheets that can form on the surface of the blades and that are separated from the surface to become true dangers for individuals brought to operate in the vicinity [sic].

The frost or the ice also causes, even a thin layer, an excess weight that adversely affects production and that also causes imbalances between the blades, leading to vibrations that are harmful to the operating life of the bearings of the rotor and of the different parts of the wind turbine.

Wind turbines are monitored and sensors are installed in the blades and the base of the rotor as well as an actuator to ensure the orientation of the blades, a mechanical unit known also as "pitch." Therefore, it is noted that an electric power source already exists near the blades. Actually, it involves either a three-phase current for an electric actuator, or a 24-volt current for the end-of-travel indicators, etc., for a hydraulic actuator.

Wind turbine blades are made of composite materials having a base of polyester or epoxide matrices, with fiberglass reinforcements, carbon fibers, and with a core of lightweight material of the balsa or foam type.

Blades of large size are hollow, often made of two half-shells assembled in the median plane of the leading edges and trailing edges.

Solutions of the prior art are known whose purpose is de-icing wind turbine blades but which are unsatisfactory for numerous reasons.

For example, the patent application WO 2011018695 that describes segments of thermoelectric films having a base of polyimide-impregnated carbon can be cited. These films are added to the surface of the blades, which is not satisfactory with regard to the operating weather conditions and to the rapid degradation of this surface by the external damages of rain, hail, sleet.

Likewise, the patent application WO 201028653 discloses an embodiment of a layer of material that includes conductive nanoparticles but this requires the production of nanoparticles. The addition of metallic components adds to the equivalent radar signature, always liable to disrupt military and weather authorities.

The patent application WO 200079128 describes a heating system with an arrester comprising metal sheets that form resistance. This is a resistance heating system with the drawbacks linked to the fact of placing metal parts in the blades and of generating pinpoint sources of heat rather than a suitable distribution.

Wind farm operators are looking for a solution that is inexpensive, maintenance-free, lightweight for a perfect integration of the rotor, a balancing of the blades with a difference in weights with the same play of less than 5%, without danger to personnel, which does not change the profile of the blades, which does not complicate the production of the blades, which is esthetically unobtrusive, which avoids a modification of the wind turbine itself and which can be adapted to blades to be constructed but also for retrofitting on installed blades, the number of wind farms affected by frost already being very significant on all continents.

BRIEF DESCRIPTION OF THE DRAWINGS

The object of this invention is to provide a solution that eliminates the problems mentioned. This solution will now be described with regard to the accompanying figures that show.

DETAILED DESCRIPTION OF THE PREFERRED EMBODIMENTS

Figure 1:
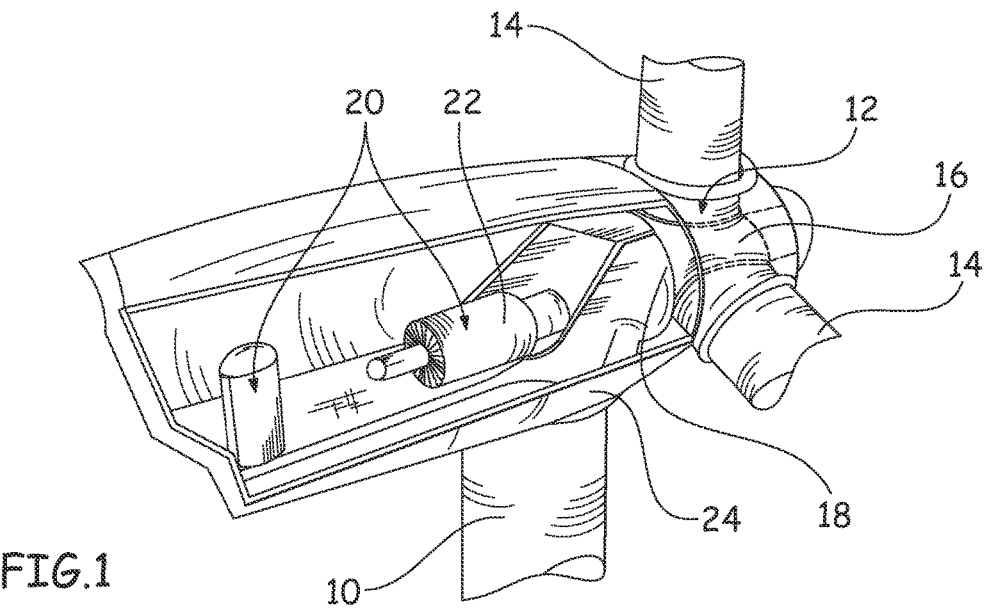
FIG. 1: a view of a wind turbine.
Figure 2:
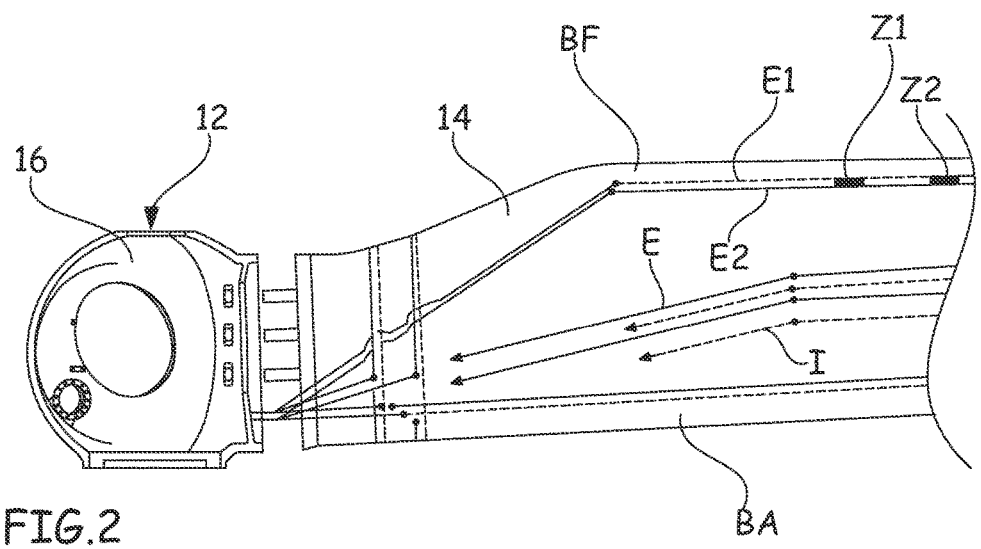
FIG. 2: a diagrammatic view of a wind turbine blade and of its hub equipped with the de-icing device according to this invention.

This invention is now described with regard to the figures interchangeably.

The wind turbines comprise a mast 10, a rotor 12 consisting of blades 14 that are integral with a carrier part 16 called a "hub," which is a hub mounted on a bearing 18 and means 20 for producing current, particularly a current generator 22.

Either the generator is driven directly by the rotor 12, or by means of a multiplier. For this invention, the arrangement for producing electricity does not matter, knowing that the device for de-icing wind turbine blades according to the invention finds application in all of the embodiments.

The means for producing electricity are generally housed in a casing called a nacelle 24 so as to protect the assembly of these electrical components.

The electricity is then conducted to the network.

It is therefore understood that the electric power is available not far from the hub and the blades.

Furthermore, for the requirements for control of the wind turbine, in particular the interior or exterior lighting, the sensors or quite simply the activation of the generator, there are different internal electrical circuits, near the blades.

So as to enable the control of the orientation of the blades in relation to the hub that carries them, motors M for orientation of the blades are provided. When the power plant M is electric, electrical connections are provided to power these motors and/or to control them. As a result, well-known arrangements of the prior art are provided with a rotary collector also called a "slip ring" that is interposed between the stationary part of the hub and the rotating hub. The rotary collector is suitable as a function of the type of power, of the type of current. It is even possible to mount several concentric rotary collectors as a function of the currents and of the destinations.

The manufacture of the composite material blades of a wind turbine consists in producing profiles by molding in a known way with stiffeners so as to obtain the best compromise between weight, rigidity, and mechanical strength.

On the exterior portion, each blade receives a layer of finishing material, generally a gel coat that is a material that is very resistant to wear, which exhibits a naturally polished surface state from the polymerization, so as to limit the production of turbulence, of micro-turbulence on the surface and the sum of turbulences that increase the drag and reduce the yield.

These manufactures are well known in aeronautics for airplanes with airframes of composite materials.

The gel coat also has a role as a barrier to UV rays, and to humidity, and its coefficient of wettability is very low, which prevents retaining droplets of water or a film of water.

Moreover, French patent application FR 2 880 350, with the RESCOLL Company as patent holder, is known, with the RESCOLL Company relating to a process for manufacturing a polyaniline or substituted forms of polyaniline at the level of aromatic cores or nitrogen atoms as an electricity-conducting material. Hereinafter, these polyanilines are referred to as the family of doped polyanilines.

The process consists in polymerizing the aniline in the presence of at least one dopant (A) and optionally of other additives such as plasticizers, surfactants, binders or else coloring agents.

The reaction used is the following:

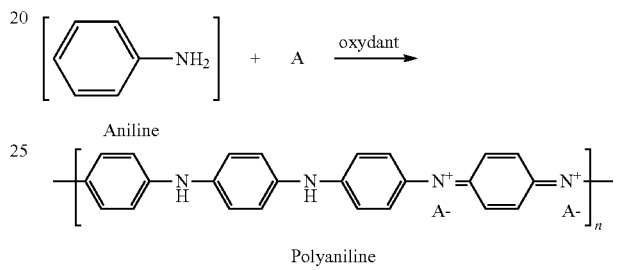

[oxidant = oxidizing agent]

The doped polyaniline obtained is then purified in an alcohol medium and then dissolved again in demineralized water.

The dopants A used for the process for manufacturing the polyaniline according to this invention comprise a tightening agent (R) that is hydrophilic, flexible, adjustable and surface-active.

These dopants A comply with the following general formula:

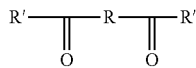

in which:

R is a water-soluble radical, with a surfactant nature, and which represents namely:

a primary or secondary diamine of formula

x and n being integers, x varying between 1 and 5, and n varying between 1 and 20 a polyethylene glycol of formula

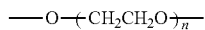

n being an integer between 1 and 20, and preferably between 1 and 14.

a polyethylene oxide of formula $$\text{---O}\text{---}(\text{CH}_2\text{O})_n\text{---}$$

n being an integer between 1 and 20, and preferably between 1 and 14.
a glycerol of formula $$\text{---O---CH}_2\text{---CH}\begin{array}{l}\text{CH}_2\text{---O---}\\ \diagdown\\ \text{O}\\ \diagdown\end{array}$$

R' represents namely:
an alkane, associated with an acid group, of formula $$\text{CH}_2\text{---R0}$$

in which R0 represents $SO_3H$, $PO_3H_2$ or COOH,
at least one aromatic ring, containing several acid groups, of formula in which:
R1 represents $SO_3H$, $PO_3H_2$ or COOH,
R2 represents H, OH, $CH_3(CH_2)_x$ (x=0, 1, 2, 3 ... ), $NO_2$, $SO_3H$, Cl or Br,
R3 represents H, OH, $SO_3H$, Cl or Br,
R4 represents H, OH, $SO_3H$, Cl or Br, and
R5 represents H, OH or $SO_3H$ 6.
The yield of the reaction for polymerization of the polyaniline according to the manufacturing process according to the invention is greater than 80%.

Thus, a doped polyaniline, which can be combined with other polymers particularly for the making of formulations for coatings of the electrically-conductive paint type, is obtained.

These conductive formulations of organic polymer, thanks to the molecules of the dopant, make it possible to obtain flexibility and electrical conductivity and therefore make it possible to focus on resistive applications by Joule effect.

Electric power supply electrodes should also be provided. Such electrodes can endure corrosive effects on the part of the polyaniline. A protective silver coating may prove necessary.

The conductive polymer thicknesses that can be envisaged are between 10 and 500 µm, preferably between 50 and 200 µm. With such thicknesses, a surface resistivity of the coating is obtained between 20 and 200 Ohm/unit of surface area making it possible to generate powers of 300 to 500 W/m² under a low current of 48 V and a distance between the electrodes on the order of 30 cm. The temperature reached is on the order of 50° C.

The method for de-icing composite material structures according to the invention, particularly the method for de-icing blades of a wind turbine according to this invention, consists in:
placing at least one conductive layer of a formulation having a conductive polymer base on at least one portion of the surface of each blade,
providing a suitable electric power supply in each blade, and
connecting the layer of a formulation of conductive polymer to the electric power supply so as to be able to bring about a heating of said conductive layer of doped polyaniline,
controlling the electric power supply as a function of the weather conditions.

The conductive polymer can advantageously be a formulation having a base of doped polyaniline, which is electrically conductive as has been described above.

As part of the manufacturing of new blades, the polyaniline layer can be deposited by roller directly on the structural composite and covered namely:
with a finishing layer of composite materials, itself able to receive a finishing layer (gel coat, paint, adhesive tape)
with a finishing layer that is directly added (gel coat, paint, adhesive tape).

An intermediate layer can also be provided having a base of varnish or of polyurethane resin.

As part of the retrofitting of a wind turbine, it is necessary to remove the finishing layers of each blade (gel coat, paint, adhesive tape), and then to apply the layer of the formulation having a doped polyaniline base, by roller, at a certain thickness directly on the surface of the structural composite. After drying, this polyaniline layer is protected by a finishing layer (gel coat, paint, adhesive tape, varnish, polymer coating having a polyurethane resin base).

This is a particular, nonlimiting embodiment.

The layer of formulation having a doped polyaniline base must be deposited in a layer with a thickness with a very great uniformity so as not to create a hot point.

A solution consists in preparing materials to be applied whose thickness and amount of formulation having a doped polyaniline base are perfectly controlled.

Thus, the formulation having a doped polyaniline base can be the object of an impregnation of the fibers constituting the reinforcement of one of the layers of composite materials.

The selected areas on a wind turbine blade are, in a prioritized way, the leading edge BA and the trailing edge BF.

When the leading edge is given priority, which is generally the critical area, the coating covers the leading edge BA and therefore extends over a portion of the surface of the blade back and of the pressure face. The electrodes are then placed parallel to the leading edge BA. One of the electrodes is then placed on the blade back E, and the other electrode is placed on the pressure face I.

According to this invention, it is possible to provide an application of the formulation having a doped polyaniline base over the entire surface including blade back E and pressure face I, so as to respond to all icing situations.

Actually, the leading edges and trailing edges are given priority when the blades rotate but the case where the blades are stopped must also be provided for; the entire surface is then affected, and de-icing must occur before any return to operation.

The formulation having a doped polyaniline base could be deposited on the surface and the product obtained would be satisfactory, but for reasons of longevity, durability, and reliability, it is preferable to provide a protective layer, a gel-coat type at least. The gel-coat layer ensures protection from UV rays, mechanical damage linked to erosion, and to hail in particular. A layer of varnish or of polyurethane can also ensure additional protection.

In the same way, it is possible to position several layers of formulation having a doped polyaniline base at different overlapping sites, at different depths with regard to the thickness of the blade, so as to deal with slight icings, and severe icings.

In the case of the manufacture of the blades, it can also be provided to impregnate a fabric as indicated above but entering directly into the manufacture of the blade with at least one formulation having a doped polyaniline base, and to include this impregnated fabric in the series of manufacturing layers of the composite.

The control of the heating is adapted to the situation. If the icing conditions are too great, the wind turbine will be stopped because the related power consumption runs the risk of being greater than the production, which is the limit that is not to be exceeded.

This control is advantageously entrusted to a controller who, as a function of the conditions of temperature, wind, humidity, and ice deposition, controls the de-icing device according to this invention, the different surface areas and the different areas of depth.

For arrangements that pertain to wind turbine blades of large dimensions, an electric power supply problem arises. A solution, shown diagrammatically in FIG. 3, consists in making heating areas, Z1, Z2 . . . Zn, which are powered by a parallel connection from two electrodes E1 and E2. Nevertheless, the distal areas of the hub are difficult to power because of the power needed to pass through said electrodes.

Figure 3:
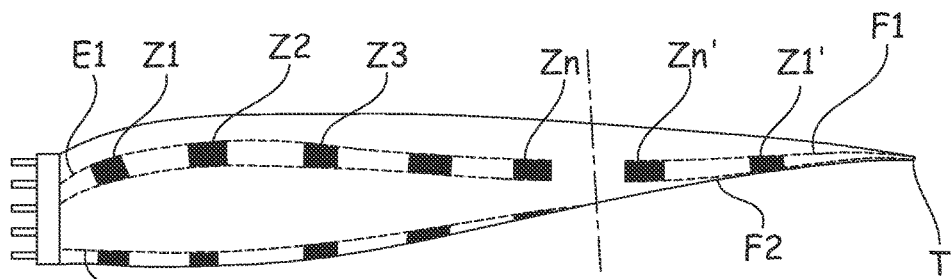
FIG. 3: a diagrammatic view in perspective of a wind turbine blade, equipped with the de-icing device according to this invention.

A solution, which can be seen at least in FIG. 3, consists in passing a power supply through the interior of the blade and in having the cables F1, F2 of said power supply go out through a hole T at the tip of the blades, to power the areas Z'1 . . . Z' n.

Actually, each blade is provided with a hole T for evacuation of condensation waters so that the mechanical stresses caused by the presence of this hole have already been taken into account.

Power supply through the end is therefore possible without modifying the design of the blade including for retrofitting.

Another problem is also the necessary presence of probes for measuring the temperature using thermocouples. For this purpose and to reduce the number of wires passing through the blade, it is possible to use wireless thermocouples.

The invention claimed is:

1. A method for de-icing a composite material structure, comprising the following steps:
   placing at least one conductive layer of a formulation having a conductive polymer base on at least one portion of a surface of the structure;
   providing an electric power supply for the structure; and
   connecting the conductive layer of the formulation having the conductive polymer base to the electric power supply so as to be able to bring about a heating of said conductive layer,
   wherein the electric power supply is controlled as a function of weather conditions, and
   wherein the conductive polymer is selected from among the family of doped polyanilines obtained according to the following reaction:

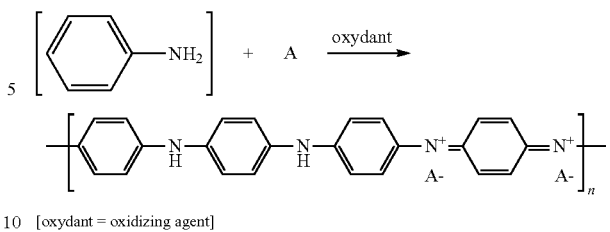

[oxydant = oxidizing agent]

with A selected from among dopants of general formula:

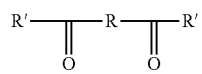

in which:
R is a water-soluble radical, with a surfactant nature, and which represents namely:
a primary or secondary diamine of formula

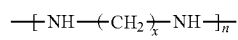

x and n being integers, x varying between 1 and 5, and n varying between 1 and 20,
a polyethylene glycol of formula

n being an integer between 1 and 20,
a polyethylene oxide of formula

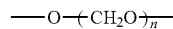

n being an integer between 1 and 20, and
a glycerol of formula

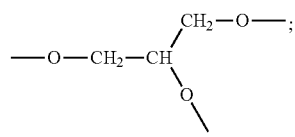

and
R' represents namely:
an alkane, associated with an acid group, of formula $CH_2$—R0 in which R0 represents $SO_3H$, $PO_3H_2$ or COOH, and
at least one aromatic ring, containing several acid groups, of formula

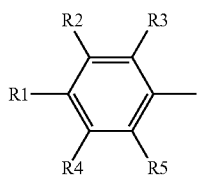

in which:
R1 represents $SO_3H$, $PO_3H_2$ or COOH,
R2 represents H, OH, $CH_3(CH_2)_x$ (x=0, 1, 2, 3 ...), $NO_2$, $SO_3H$, Cl or Br,
R3 represents H, OH, $SO_3H$, Cl or Br,
R4 represents H, OH, $SO_3H$, Cl or Br, and
R5 represents H, OH or $SO_3H$ 6.

2. The method for de-icing the composite material structure according to claim 1,
wherein the conductive layer of the formulation having the conductive polymer base is incorporated into composite materials that make up said structure.

3. The method for de-icing the composite material structure according to claim 1,
wherein the conductive layer of the formulation having the conductive polymer base is placed under a finishing gel-coat.

4. The method for de-icing the composite material structure according to claim 1, further comprising:
placing a plurality of said conductive layers of the formulation having the conductive polymer base at different depths in composite materials that make up said structure.

5. The method for de-icing the composite material structure according to claim 1, further comprising:
impregnating a fabric with a formulation having an electrically conductive polymer base.

6. The method for de-icing composite material structures according to claim 2,
wherein the conductive layer of the formulation having the conductive polymer base is placed under a finishing gel-coat.

7. The method for de-icing composite material structures according to claim 2, further comprising:
placing a plurality of said conductive layers of the formulation having the conductive polymer base at different depths in the composite materials.

8. The method for de-icing composite material structures according to claim 2, further comprising:
impregnating a fabric with a formulation having an electrically conductive polymer base.

* * * * *